(12) United States Patent
Holloran

(10) Patent No.: US 10,278,174 B2
(45) Date of Patent: Apr. 30, 2019

(54) SYSTEM AND METHOD OF SPECTRUM ALLOCATION

(71) Applicant: CHARTER COMMUNICATIONS OPERATING, LLC, St. Louis, MO (US)

(72) Inventor: Thomas J. Holloran, Parker, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 8 days.

(21) Appl. No.: 15/669,503

(22) Filed: Aug. 4, 2017

(65) Prior Publication Data

US 2019/0045502 A1 Feb. 7, 2019

(51) Int. Cl.
*H04W 72/04* (2009.01)
*H04W 72/08* (2009.01)

(52) U.S. Cl.
CPC ...... *H04W 72/0446* (2013.01); *H04W 72/087* (2013.01)

(58) Field of Classification Search
CPC . H04W 72/02; H04W 72/04; H04W 72/0446; H04W 72/08
See application file for complete search history.

(56) References Cited

U.S. PATENT DOCUMENTS

| 6,252,868 | B1 * | 6/2001 | Diachina | H04B 7/24 370/347 |
| 6,748,219 | B2 * | 6/2004 | Jokinen | H04W 16/00 455/422.1 |
| 8,243,751 | B2 * | 8/2012 | Visa | H04L 12/2803 370/442 |
| 8,843,978 | B2 | 9/2014 | Hardin | |
| 2003/0021245 | A1 * | 1/2003 | Haumonte | H04L 5/0007 370/330 |

* cited by examiner

*Primary Examiner* — Diane D Mizrahi
(74) *Attorney, Agent, or Firm* — Meagher Emanuel Laks Goldberg & Liao, LLP

(57) ABSTRACT

Systems, methods, architectures, mechanisms or apparatus for allocating a group of content channels among a plurality of slots of a radio frequency (RF) signal in a manner minimizing the number of slots necessary to support the content channels and number of movements of content channels between slots.

24 Claims, 7 Drawing Sheets

SLOT OPTIMIZATION $$\text{Minimize:} \quad \sum_{i=1}^{N} x_i$$

$$\text{Subject to:} \quad \sum_{i=1}^{N} a_{ik} x_i \geq D_k \quad \forall k, k=1, \ldots, K$$

$$x_i \geq 0, \text{ integer}$$

where:

$x_i$ = number of slot assignment patterns of type $i$ needed for the lineup $a_{ik}$ = number of type $k$ channels included in slot pattern $i$, $D_k$ = total number of type $k$ channels required by the lineup, $N$ = total number of unique patterns that are capable of fitting into an slot $K$ = total number of channel types
(e.g. HD, SD, DA, SDV, VOD, DOCSIS, RESERVED)

400

FIG. 4

CHANNEL MOVE OPTIMIZATION $$\text{Minimize: } \sum_{i=1}^{M} \sum_{j=1}^{N} c_{ij} x_{ij}$$

$$\text{Subject to: } \sum_{i=1}^{M} \sum_{j=1}^{N} a_{jk} x_{ij} \geq D_k \quad \forall\, k,\, k=1,\ldots,K$$

$$\sum_{i=1}^{M} \sum_{j=1}^{N-1} x_{ij} = L$$

$$\sum_{j=1}^{N} x_{ij} = 1 \quad \forall\, i,\, i=1,\ldots,M$$

where:

$x_{ij}$ = 0 or 1 (1 if pattern $j$ is assigned to EIA $i$, 0 otherwise)

$c_{ij}$ = number of channel assignment changes/moves required if pattern $j$ is assigned to slot $i$, $a_{jk}$ = number of channels of type $k$ in pattern $j$, $D_k$ = number of channels of type $k$ required by the lineup $L$ = number of slots to be assigned channels $N$ = number of patterns (Note: Pattern N contains 0 channels)

$M$ = number of slots $K$ = total number of channel types
(e.g. HD, SD, DA, SDV, VOD, DOCSIS, RESERVED)

COMBINED SLOT AND CHANNEL MOVE OPTIMIZATION $$\text{Minimize: } \sum_{i=1}^{M} \sum_{j=1}^{N} c_{ij} x_{ij} + \sum_{i=1}^{M} 1000 y_i$$

$$\text{Subject to: } \sum_{i=1}^{M} \sum_{j=1}^{N} a_{jk} x_{ij} \geq D_k \quad \forall\, k,\, k=1,\ldots,K$$

$$\sum_{j=1}^{N} x_{ij} - 1000 y_i \leq 0 \quad \forall\, i,\, i=1,\ldots,M$$

$$\sum_{j=1}^{N} x_{ij} \leq 1 \quad \forall\, i,\, i=1,\ldots,M$$

where:

$y_i$ = 0 or 1 (1 if *EIA i* is used, 0 otherwise)

$x_{ij}$ = 0 or 1 (1 if pattern *j* is assigned to *EIA i*, 0 otherwise)

$c_{ij}$ = number of channel assignment changes/moves required if pattern *j* is assigned to slot *i*

$a_{jk}$ = number of channels of type *k* in pattern *j*, $D_k$ = number of channels of type *k* required by the lineup $N$ = number of patterns $M$ = number of slots $K$ = total number of channel types
(e.g. HD, SD, DA, SDV, VOD, DOCSIS, RESERVED)

SYSTEM AND METHOD OF SPECTRUM ALLOCATION

FIELD OF THE DISCLOSURE

The present disclosure generally relates to communications network management and, more particularly but not exclusively, to allocating RF spectrum in communications network such as a cable television network.

BACKGROUND

Cable television systems (and other networks) deliver video, voice, and internet data connectivity to residential customers over the radio frequency (RF) spectrum made available through hybrid fiber-coax (HFC) cable communications networks. Internet data is delivered using a set of standards called Data Over Cable Service Interface Specification (DOCSIS) which define the way that a portion of the RF Spectrum can be allocated and managed to deliver Internet Protocol (IP) data traffic to network cable modems along with video traffic. Because downstream IP traffic has grown over recent years at a compound annual growth rate of 40-60%, cable services bandwidth and the spectrum it requires has become increasingly scarce. While cable industry hardware and software advances have incrementally increased the amount of bandwidth that can be accommodated by a fixed (e.g., 1 GHz) spectrum, allocation of the spectrum among competing linear video and internet data sources has become more and more challenging for MSO operators.

SUMMARY

Various deficiencies in the prior art are addressed by systems, methods, architectures, mechanisms or apparatus for allocating a group of content channels among a plurality of slots of a radio frequency (RF) signal in a manner minimizing the number of slots necessary to support the content channels and number of movements of content channels between slots.

In one embodiment, a method for allocating a group of content channels among a plurality of slots of a radio frequency (RF) signal comprises identifying for each content channel within the group of content channels a bandwidth requirement and a current RF slot assignment; determining, for each RF slot, a respective plurality of allowable content channel assignment combinations; determining, for the group of content channels, a minimum number of RF slots sufficient to distribute the group of content channels; determining a minimum number of content channel reassignments sufficient to allocate the group of content channels to the minimum number of RF slots; and reassigning the determined minimum number of content channels to generate thereby a channel map including the plurality of content channel allocated to the minimum number of RF slots.

BRIEF DESCRIPTION OF THE DRAWINGS

The teachings herein can be readily understood by considering the following detailed description in conjunction with the accompanying drawings, in which:

FIG. 4 depicts a slot optimization method suitable for use in the method of FIG. 2;

FIG. 5 depicts a channel move optimization method suitable for use in the slot optimization method of FIG. 2;

FIG. 6 depicts a combined slot optimization and channel move optimization method suitable for use in the method of FIG. 2.

To facilitate understanding, identical reference numerals have been used, where possible, to designate identical elements that are common to the figures.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Figure 1:
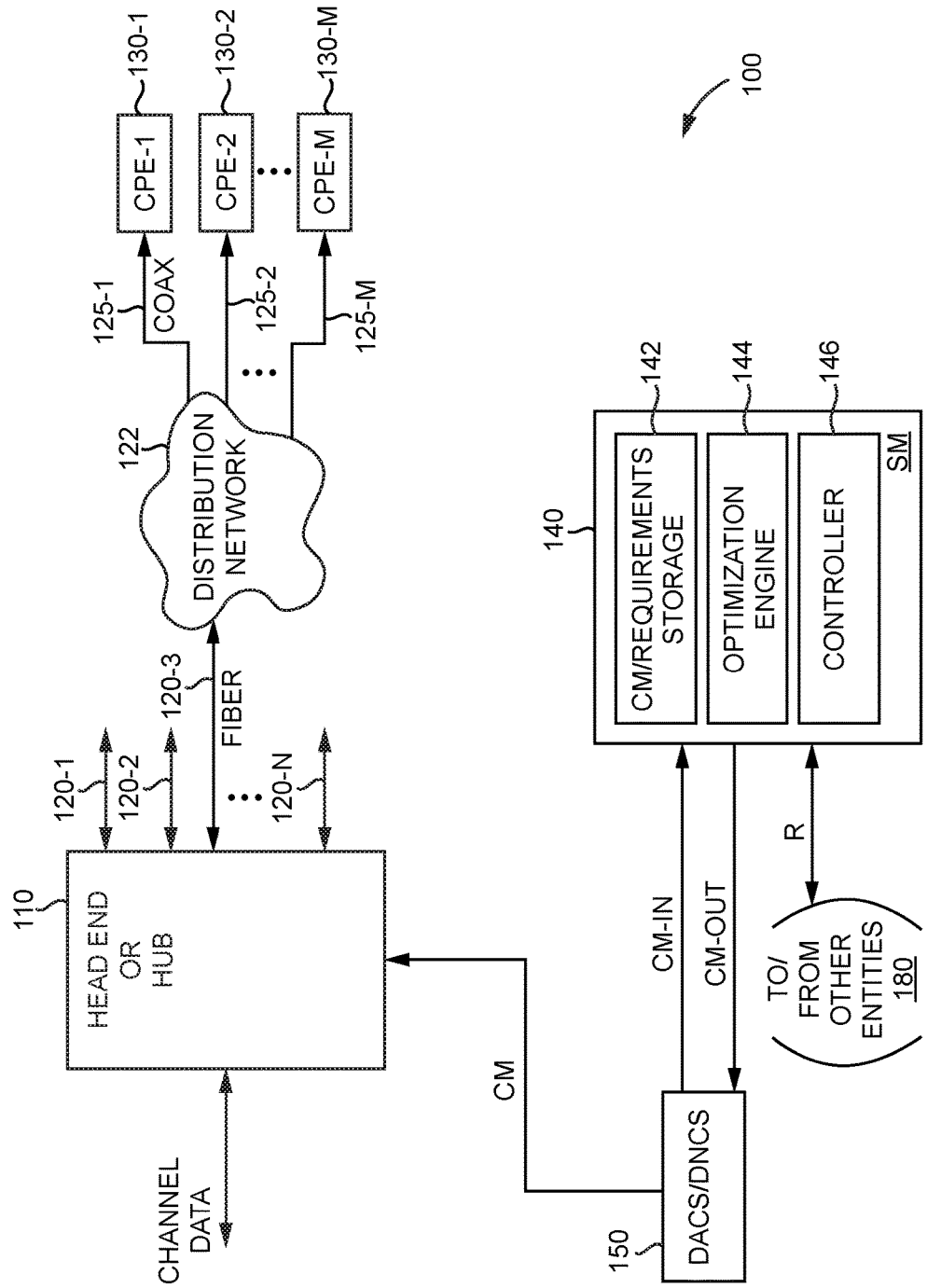
FIG. 1 depicts a simplified block diagram of a portion of content delivery system benefiting from various embodiments.

FIG. 1 depicts a simplified block diagram of a portion of content delivery system 100 (e.g., a cable television system or other content distribution network) benefiting from various embodiments.

The system 100 of FIG. 1 is depicted as comprising a head end or hub 110 receiving channel data from one or more provider equipment (PE) entities (not shown) within the content delivery system 100. Received channel data comprises, illustratively, broadcast or "linear" video programming such as via television channels, digital audio programming such as broadcast audio and the like. Received channel data may also comprise on-demand or "non-linear" video programming, on-demand digital audio programming and the like. The received channel data is propagated toward each of a plurality of groups or neighborhoods of customer premises equipment (CPE) 130 via respective high bandwidth communications links 120 communicatively coupled to a hierarchical fiber distribution network 122, which in turn is communicatively coupled to lower bandwidth communications links 125 (e.g., coax "drop" links) delivering signal to CPE 130.

FIG. 1 depicts a plurality of high bandwidth communications links (e.g., fiber links) 120-1, 120-2 and so on up to 120-N (collectively high bandwidth communications links 120) for propagating received channel data from the head end or hub 110 toward a respective group or neighborhood of customer premises equipment (CPE). As an example, FIG. 1 depicts a third (120-3) high bandwidth communications links communicating with a group or neighborhood of customer premises equipment (CPE) 130-1, 130-2 and so on up to 130-M (collectively CPE 130) via, illustratively, a distribution network 122 (e.g., a Hybrid Fiber Coax (HFC) for cable network, an optical network and the like) and respective low bandwidth links 125 (e.g., "drop" links) at each CPE 130.

The low bandwidth links 125 may comprise Hybrid fiber-coaxial (HFC) transmission medium supporting one or more radiofrequency (RF) carrier signals (e.g., carrier signals of 1 GHz, 10 GHz or some other frequency) having defined therein a plurality of RF slices or slots (e.g., slots of 6 MHz, 3 MHz, 1 MHz or some other larger or smaller spectral allocation). In particular, the received channel data is allocated to the various slots in accordance with, illustratively, a channel map (CM) provided to the head end or hub 110 by a control system such as a Digital Addressable Controller (DAC) 150 (or Digital Network Control System (DNCS) 150) or some other entity within the system 100.

As depicted in FIG. 1, each RF carrier signal conveyed to respective CPE 130 is initially multiplexed or combined within an optical signal transmitted via high-bandwidth communication links 120-3 such as via a RF over Fiber technique. Further, the distribution network 122 may comprise a peer to peer network, mesh network, grouping of hierarchical network elements/routers or any other type of network suitable for use in conveying information between the head end or hub 110 and CPE 130. While the various embodiments are primarily discussed within the context of allocating RF slices or slots within low bandwidth links 125, it will be appreciated by those skilled in the art and informed by the present teachings that various embodiments may also be used to allocate Thus, received channel data is propagated towards CPE 130 via a subset of the slots defined within the carrier signal. The RF slices or slots not used to propagate received channel data may be used for non-linear programming such as on-demand video programming, streaming video services, streaming audio services and various other Internet related services.

Various embodiments described herein operate to efficiently reallocate linear programming across RF slices or slots to thereby increase the number of RF slices or slots available for non-linear programming.

FIG. 1 depicts CPE 130 such as DOCSIS-compliant cable modems and the like to access various network services such as Internet connectivity, streaming media, file sharing, document collaboration, voice over Internet protocol (VoIP) and so on.

FIG. 1 depicts a spectral manager 140 configured to allocate and/or reallocate channel data across RF slices or slots of the various carrier signals propagated within the high bandwidth communications links 120 of the system 100 of FIG. 1. The spectral manager 140 is depicted as a distinct element within the system 100 of FIG. 1. However, it will be appreciated that the spectral manager 140 may be implemented within a head end or hub 110, a DACS/DNCS 150, or within some other PE within the system 100. Further, the SM 140 may be implemented using computing hardware or a combination of computing hardware and software such as described below with respect to FIG. 7.

The SM 140 is depicted as receiving an indication of a current spectral allocation such as via and input channel map (CM-IN) from the DACS/DNCS 150. The SM 140 may also receive additional requirements information (R) associated with the current spectral allocation, the linear programming to be carried thereon and the like from the DACS/DNCS 150 or from one or more other entities 180 (not shown) within the system 100.

The SM 140 processes the spectral allocation information as well as any additional requirements information to generate thereby an output channel map (CMOUT) suitable for use by the DACS/DNCS 150, head end or hub 110 and/or CPE 130. In particular, the SM 140 is depicted as including non-transitory computer readable storage suitable for storing channel map and requirements data 142 and an optimization engine 144. The SM 140 is further depicted as including a controller 146 operative to perform various control, management and other functions as will be discussed in more detail below.

Various embodiments depict the SM 140 utilizing a set of processes to identify a minimum number of, illustratively, EIA (Electronic Industry Association 6 MHz) slots required for a Channel Map accommodating existing linear video, digital audio and internet data requirements such that a maximum (remaining) number of slots can be allocated to non-linear content, internet data traffic and the like. Various embodiments further identify the specific patterns that should be used in order to minimize RF Lineup disruption required in order to adhere to the identified minimum EIA slot solution. These embodiments will be discussed in more detail below with respect to FIGS. 2-6.

The methods described herein use integer programming within the context of a first methodology for defining a minimum number of RF slices or slots required to service a set of linear video, digital audio, non-linear video, and internet data traffic requirements, and a second methodology for identifying a minimum number of changes to existing RF slice/slot assignments (e.g., as per a channel map) required to use only the minimum number of slots. A third methodology combines the first and second methodologies to define the minimum number of slots and identify the minimum number of assignment changes in a single optimization process.

Figure 2:
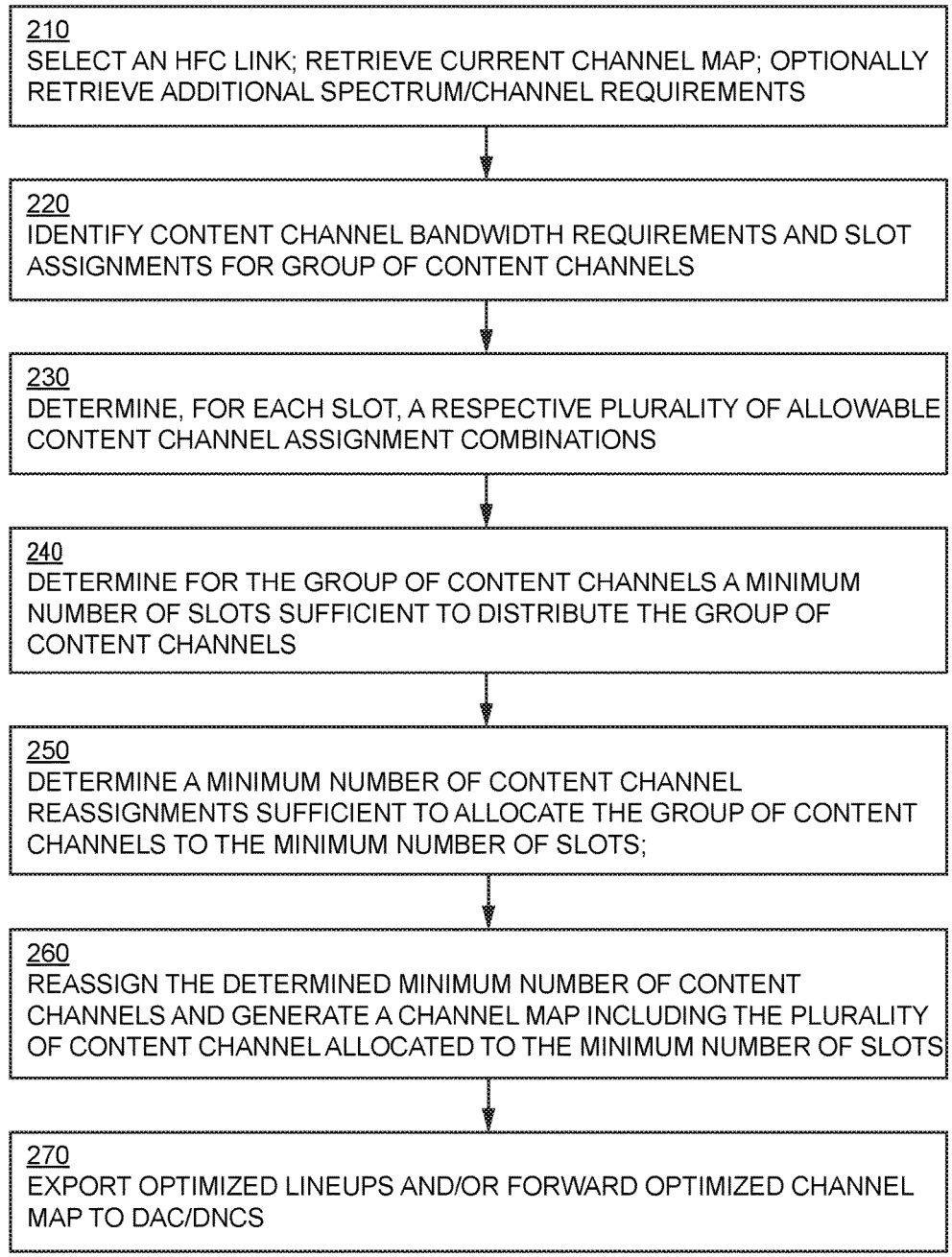
FIG. 2 a flow diagram of a slot optimization method according to an embodiment.

FIG. 2 depicts a flow diagram of a slot optimization method according to one embodiment. Specifically, the method 200 of FIG. 2 may be implemented by a spectral manager 140, a head end or hub 110, or a management system (not shown) or other provider equipment entity such as within the system 100 of FIG. 1.

Generally speaking, the method 200 of FIG. 2 operates to efficiently reallocate content channels across a plurality of defined slots within the available RF spectrum of a communications link, illustratively EIA slots comprising 6 MHz spectral slices within a 1 GHz carrier signal propagated via a communications link. In the various embodiments discussed herein, content channels are broadly defined to include broadcast or linear video channels, digital audio channels, non-linear video, Internet data traffic and the like. Content channels bearing other types of data may be allocated in a similar matter.

At step 210, a Hybrid fiber-coaxial (HFC) or other communication link to be optimized is selected. Further, the current channel map associated with the selected link is received, such as from a Digital Addressable Controller (DAC), Digital Network Control System (DNC as) or other entity within the system 100. Optionally, additional spectrum/channel requirements may be received from various entities within the system 100.

At step 220, the content channel bandwidth requirements and slot assignments are identified for each content channel within a group of content channels propagated via the communications link. This information may be derived from, illustratively, the retrieved current channel map.

At step 230, various allowable content channel assignment combinations for each slot or determined. This determination may be made in accordance with the bandwidth requirements of the various types of content (e.g., broadcast video, digital audio etc.) Identified within the channel map, identified by any additional spectrum/channel requirements and so on. That is, substantially all combinations of channel map assignment patterns allowed on an individual slot are determined or retrieved from another network entity.

At step 240, a determination is made as to a minimum number of slots sufficient to distribute the group of content channels. That is, given the various types of content to be distributed and the available slots available for such distribution, a determination is made as to the minimum number of slots sufficient to enable such distribution.

In various embodiments, the determination of step 240 may be performed in accordance with the EIA (or other) slot optimization method 400 discussed below with respect to FIG. 4.

At step 250, a determination is made as to a minimum number of content channel reassignments sufficient to allocate the group of content channels to the minimum number of slots. That is, at step 250 a determination is made as to, illustratively, a minimum number of content channel reassignments such as from the current channel map received at step 210 to provide thereby a new channel map including such content channel reassignments where the new channel map allocates a group of content channels across the determined minimum number of slots.

In various embodiments, the determination of step 250 be performed in accordance with the channel move optimization method 500 discussed below with respect to FIG. 5.

In various embodiments, the determination of step 240 and the determination of step 250 are performed in accordance with the combined slot and channel move optimization method 600 discussed below with respect to FIG. 6.

At step 260, the determined minimum number of content channels are reassigned such that the group of content channels occupies the determined minimum number of slots to generate thereby a new channel map. That is, at step 260 the method 200 re-assigns programs in the Channel Map according to the pattern assignments defined by the optimization methods shown in FIGS. 4-6.

In one embodiment, at step 260 the new channel map is generated by:

(1) creating an export channel map or table in accordance with the input channel map or table format and filling it with EIA channel and program type information of the determined patterns;

(2) populating the export table with programs which were not moved (e.g., Join Export and Import Tables based on matching EIA Channel/Program Type/Order within Program Type); and (3) populating the export table with programs that need to move by applying preferred engineering or business rules, such as via the following process(es):

1. Filling the export table from bottom to top of spectrum based on prior order by (a) Sort unfilled Program slots in Export table using EIA and Program Type, add 1-N Index for each Program Type; (b) Sort unassigned Program slots in Import table using EIA Channel and Program Type, add 1-N Index for each Program Type; and (c) Fill Export table with Import Table Program Channel Names by joining tables based on Program Type, 1-N Index.

2. Assigning programs manually by location preference using pattern assignments defined by the optimization methodologies.

At step 270, the optimized lineups are exported and/or the newly generated "optimized" channel map is forwarded to the DACS/DNCS 150.

Thus, the method 200 of FIG. 2 operates to generate all possible program combination patterns that can be placed in a single slot, determine the minimum number of slots that are required to accommodate the RF lineup programming in a Channel Map, determine the minimum number of lineup program moves that will need to be made in order to use the minimum number of slots, and assign the existing programs in accordance with the identified optimal patterns to produce a complete Channel Map.

Figure 3:
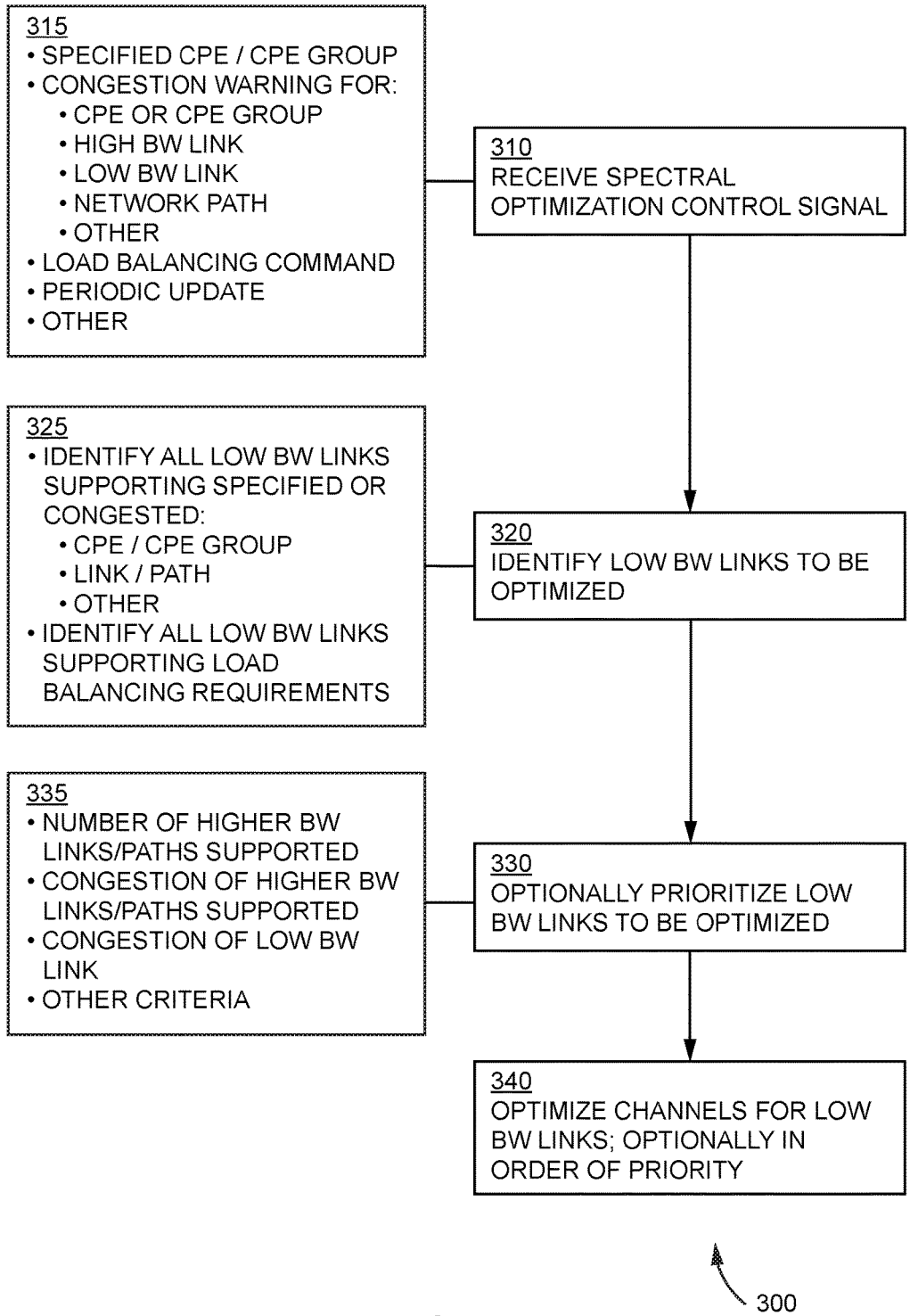
FIG. 3 depicts a system optimization method according to an embodiment.

FIG. 3 depicts a system optimization method according to an embodiment. Specifically, the method 300 of FIG. 3 may be implemented by a spectral manager 140, a head end or hub 110, or a management system (not shown) or other provider equipment entity such as within the system 100 of FIG. 1

Generally speaking, the method 300 of FIG. 3 operates to invoke the slot optimization method 200 of FIG. 2 in response to a spectral optimization control signal such as provided by a management system, network operations center and the like to optimize one or more content channels such as in response to periodic scheduling, network congestion, load-balancing requirements and the like.

At step 310, a spectral optimization control signal is received. The control signal may be received form another network entity, such as a DACS/DNCS 150, a local or remote management entity, a network operations center and the like. The spectral optimization control signal may also be generated within the spectral manager 140. Generally speaking, the control signal may comprise any type of control signal configured to indicate the need for optimization of one or more links or paths associated with CPE or groups of CPE. Referring to box 315, the control signal may specifically identify one or more CPE or CPE groups. The control signal may comprise a congestion warning signal associated with one or more CPE or CPE groups, one or more high-bandwidth links (e.g., high BW links 120), one or more low bandwidth links (e.g., low BW links 125), one or more paths through the distribution network 122 and/or some other congestion related entity (e.g., a router, head end, hub or other entity). Congestion may be defined in terms of a threshold percentage level of utilization such as 70% or 90% or some other level of utilization. The control signal may comprise a load-balancing command wherein one or more content channels are moved from a relatively congested high BW link 120 or path through the distribution network 122 to a relatively uncongested high BW link 120 or path through the distribution network 122 (other load-balancing techniques may also be employed). The control signal may comprise a periodic update signal indicative of a periodic refresh or re-optimization of various content channels (e.g., once a month, once a week, once a day etc.). Other parameters may be included within or associated with the spectral optimization control signal.

At step 320, the low bandwidth links or content channels to be optimized are identified. Referring to box 325, such identification may comprise identifying all low bandwidth links supporting specifically identified one or more CPE or CPE groups, CPE or CPE groups associated with a congestion warning, communications links, path or other network entities associated with a congestion warning. Such identification may comprise identifying all low bandwidth links supporting or associated with "from" (source) and "to" (destination) links or paths to be load balanced. For example, a high-bandwidth links 120 may transmit a high-bandwidth signal having multiplexed thereon multiple low bandwidth signals intended delivery to respective CPE 130 via respective low bandwidth links 125.

At step 330, the low bandwidth links to be optimized are optionally prioritized. That is, at step 330 the low bandwidth links identified at step 320 are arranged in order of importance for processing optimization purposes. Referring to box 335, a priority level or weight may be given to each identified low bandwidth links in accordance with the number of higher bandwidth links/paths supported or associated with the low bandwidth link, the congestion of such supported higher bandwidth links/paths, a congestion level associated with the low bandwidth link (e.g., a threshold percentage level of utilization such as 70% or 90% or some other level of utilization). Other criteria may also be used.

At step 340, the content channels associated with the various low bandwidth links are optimized, such as in accordance with the slot optimization method 200 described above with respect to FIG. 2. Optionally, the content channels associated with the various low bandwidth links are optimized in order of priority as established at step 330.

Various embodiments contemplate optimizing multiple channel maps in parallel such that the optional prioritization of low bandwidth links may not be necessary or may not yield substantial improvements to the methods herein. For example, within the context of channel management implemented using a cloud-based platform, parallel processing across multiple virtual machines enables optimization of every channel map in approximately the same amount of time otherwise needed to optimize a single channel map. This, the use of prioritization may be selected in response to the type of platform employed, the likely benefit to be derived by such prioritization and/or other factors.

The methods described herein with respect to the figures provide a number of optimization process enhancements well suited to improving service efficiency levels of network services and the like. The spectrum assignment optimization processes described herein may be enhanced in various embodiments to address a variety of engineering and operational needs.

In described herein, trigger conditions or thresholds may be used to enhance operational abilities by invoking the various optimization processes. Trigger conditions may be associated with a desired regular update frequency, recognition of lineup changes, requirements associated with software/hardware changes, and other designated operating events trigger the Optimization process. For example, a regular update frequency may be set to update all lineups in the optimized repository at pre-determined intervals (daily, weekly, monthly, etc.).

One trigger condition of interest comprises the occurrence of program changes (i.e., content or programming channel adds/deletes/changes), illustratively causing a "change flag" to be set and processed as part of an additional channel map requirement (e.g., at above steps 210-220) to modify an invoked optimization for relevant links/paths/CPE. Another trigger condition of interest comprises the creation of an optimized channel lineup (e.g., at above steps 260-270) to indicate the determination of an optimized channel lineup for subsequent processing by other system elements. which starts Step 2, and another flag to be set to start Step 6 once the optimized lineup has been created. Another trigger condition of interest comprises the initial invoking of an optimization process in response to hardware or software changes made to the network which require lineup reconfiguration.

In various embodiments, operating metrics are monitored which may indicate a need for spectrum assignment modifications due to interference on certain frequencies, reliability problems with lineups using roll-off bandwidth, usage profile changes that drive internet bandwidth or switched digital allocation settings, or a variety of other conditions. Various embodiments contemplate an automated process of evaluating the operating metrics and responsively initiating optimization methods to establish a new optimized lineup, which evaluations may be with or without use of triggering information as discussed herein.

In various embodiments, performance considerations associated with some or all of the operating metrics are used to initiate a spectrum optimization process. Expanded operating metrics may include service call volumes, node health ratings, weather events, engineering problem resolution and other criteria; some of this criteria may be used to invoke spectrum optimization processes to generate thereby new optimized lineups for one or more links/paths/CPE.

In various embodiments, standardization is used to provide a consistent and manageable channel lineup across a group of CPES, whether physically grouped (neighborhood, region, CPE capability etc.) or logically grouped (channel package, QoS guarantees etc.). Preferred templates for lineup channel assignments may created for standardizing lineup assignments across the enterprise where possible/feasible. In this manner, the creation of a common customer experience is provided while accelerating the troubleshooting of lineup spectrum assignment-related problems. Advantageously, future planning of bandwidth-impacting initiatives is simplified by reducing the number of configurations that need to be evaluated and/or changed. Standardized spectrum optimization processes allow all lineups to be created using the same preferred rule set, and aligned to a standardized assignment template simply by changing the cost coefficients described in the algorithms below.

New or existing infrastructure may be enhanced and optimized using the various embodiments described herein. For example, specific scenarios for use cases may be identified wherein the infrastructure used to support such scenarios/use cases may be functionally augmented using various embodiments described herein to thereby reduce hardware/software costs, reduce or delay capital expenditures and so on. Further, given the flexibility of the various embodiments, rollout of infrastructure hardware/software elements may be performed in a more deliberate and planned manner.

Various systems and apparatus in accordance with the embodiments are contemplated by the inventor. For example, various embodiments contemplate an apparatus for allocating a group of content channels among a plurality of slots of a radio frequency (RF) signal and comprising a spectral manager including a processor configured for: identifying for each content channel within the group of content channels a bandwidth requirement and a current RF slot assignment; determining, for each RF slot, a respective plurality of allowable content channel assignment combinations; determining, for the group of content channels, a minimum number of RF slots sufficient to distribute the group of content channels; determining a minimum number of content channel reassignments sufficient to allocate the group of content channels to the minimum number of RF slots; and reassigning the determined minimum number of content channels to generate thereby a channel map including the plurality of content channel allocated to the minimum number of RF slots.

The spectral manager may be configured to allocate channel data for each of a plurality of RF channels supporting respective customer premises equipment (CPE) within at least one group of CPE. The group of CPE may be defined according to one or more of CPE within a neighborhood, CPE within a region, CPE having common capability, CPE having a common content channel package and CPE having a common Quality of Service (QoS) guarantee.

The spectral manager may be configured to transmit a revised or reassigned channel map toward a head end communicatively coupled to the CPE, where the head end is configured to provide content channels to the CPE in accordance with the channel map.

The spectral manager may be configured for receiving, from a controller associated with a head end communicatively coupled to the CPE, a current channel map defining current slot assignments of each content channel within the group of content channels; and transmitting, toward the controller associated with the head end communicatively coupled to the CPE, a revised channel map defining slot assignments of each content channel within the group of content channels in accordance with the reassigning.

FIG. 4 depicts a slot optimization method suitable for use in the method of FIG. 2. Specifically, FIG. 4 depicts a slot optimization method in which a number of, illustratively, 6 MHz EIA slots required to meet or exceed the channel demands of a lineup are minimized.

It can be seen by inspection of FIG. 4 that slot optimization or minimization is accomplished by defining all of the acceptable patterns (sets of channel types) that can be assigned to a single EIA slot, then finding the minimum number of those patterns that are required to meet or exceed the lineup channel demands.

It is noted that the slot optimization method 400 described herein and depicted with respect to FIG. 4 does not distinguish preferences for choosing some pattern types over others. However, various embodiments contemplate assigning cost coefficients to each pattern such that the slot optimization method is adapted in response to assignment preferences as indicated by relative assignment costs (i.e., lower relative costs implying preferable assignments). Further, constraints may be added to set maximums on the number of individual channel types that are desired to be accommodated in a minimum EIA slot solution. In this way the optimization algorithm will choose among alternative optimal minimum slot utilization options the solution that is best-suited to expected future growth patterns.

FIG. 5 depicts a channel move optimization method suitable for use in the slot optimization method of FIG. 2. Specifically, FIG. 5 depicts a channel move optimization method configured to minimize channel land of disruption by minimizing a number of channels to be moved while meeting other optimization goals such as minimizing the number of slots necessary to carry the channel lineup.

It can be seen by inspection of FIG. 5 that a disruption coefficient is assigned to each pattern to EIA slot potential assignment. The disruption coefficient represents the number of program moves that would be required if the pattern is assigned to an individual EIA slot.

Various embodiments contemplate that this initial definition of disruption as channel moves is extended to include low value disruption coefficients defined to represent preferred frequency assignments for types of patterns, high cost disruption coefficients to represent assignments that may be more susceptible to reliability problems, volume buckets of disruption costs to represent thresholds of changes and other factors.

Generally speaking, channel move optimization constraints comprise a number of EIA slots to be used (established from the EIA Slot Optimization algorithm), the number of channel programs that must be accommodated, and a requirement that one and only one pattern be assigned to each EIA slot.

The number of EIA slots to be used may also be relaxed from the minimum number required for evaluation of tradeoffs between program moves (disruption) and EIA slots utilized. In this way a best overall operational solution is found through iteratively executing the algorithm with multiple values of EIA slots and disruption cost coefficients.

FIG. 6 depicts a combined slot optimization and channel move optimization method suitable for use in the method of FIG. 2. Specifically, FIG. 6 depicts an EIA Slot Optimization and Channel Move Optimization can be accomplished in a single step by combining the objectives of the methods of FIG. 4 and FIG. 5, and setting cost coefficients to establish a relative priority of objectives.

It can be seen by inspection of FIG. 6 that when solving in combination, the objective becomes minimizing the cost of EIA slots used plus the cost of associated program moves (lineup disruption). As an example, using a cost of 1000 for each EIA slot and a cost of 1 for each program move required by the assignment of a pattern to an EIA slot will result in first minimizing the overall number of EIA slots as a primary objective, with a secondary objective of minimizing moves (disruption). Actual costs derived from manpower and resource costs are used when the data can be derived. As long as there is a level-of-magnitude difference in the values, the primary and secondary objectives will remain the same. For example a $1 million cost of an EIA slot and a $1000 cost/move will force a primary objective of EIA slot minimization with a secondary objective of program move minimization. When a level-of-magnitude cost difference does not exist, the algorithm results in a single objective to minimize overall cost.

Constraints of the combined optimization model ensure all program assignment requirements are met, ensure an EIA slot is used only once, ensure the cost of an EIA slot is incurred if any pattern is assigned to it, and ensure fractions of patterns are not allowed.

Figure 7:
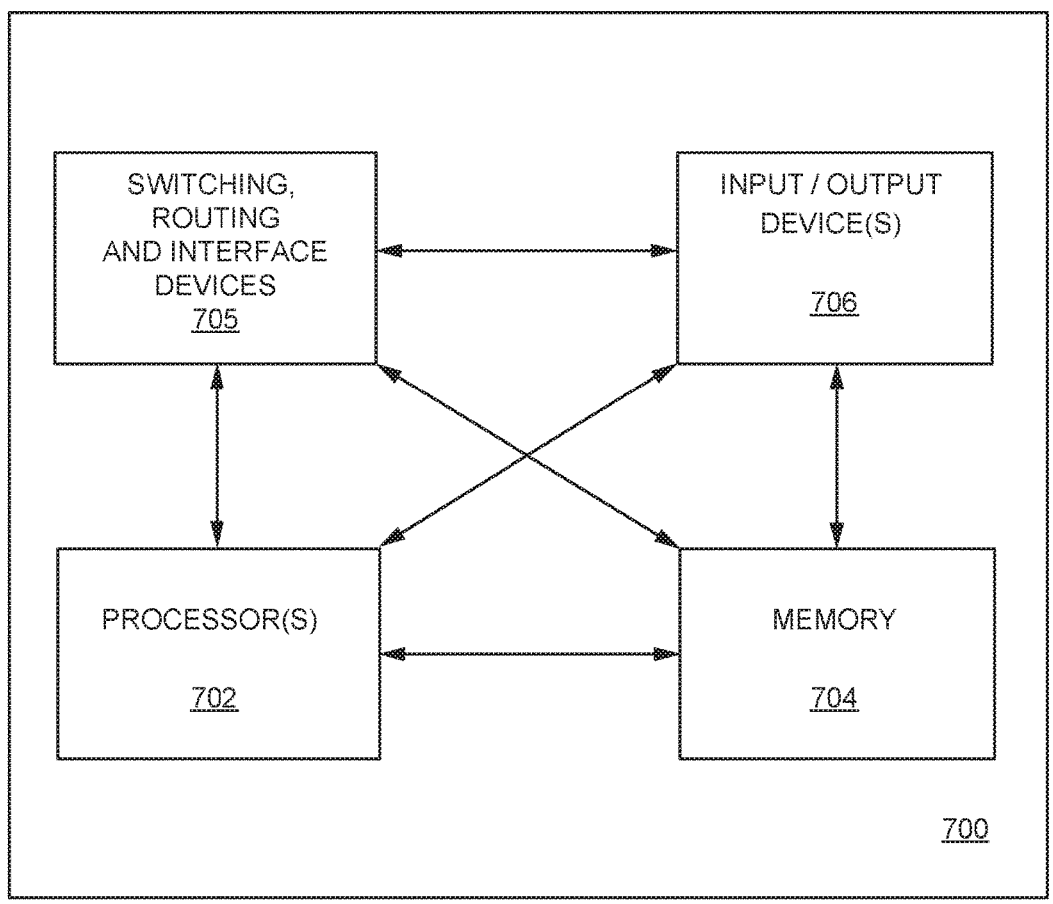
FIG. 7 depicts a high-level block diagram of a computing device suitable for implementing system elements such as used to perform the functions described herein.

FIG. 7 depicts a high-level block diagram of a computing device, such as a processor in a communications network element, suitable for use in performing functions described herein such as those associated with the various elements described herein with respect to the figures.

In particular, any of the various functional entities described herein, such as network routing entities, network management entities, server devices, client devices and so on within the communication network may be implemented in accordance with a general computing device structure such as described herein with respect to FIG. 7.

As depicted in FIG. 7, computing device 700 includes a processor element 703 (e.g., a central processing unit (CPU) or other suitable processor(s)), a memory 704 (e.g., random access memory (RAM), read only memory (ROM), and the like), a cooperating module/process 705, and various input/output devices 706 (e.g., a user input device (such as a keyboard, a keypad, a mouse, and the like), a user output device (such as a display, a speaker, and the like), an input port, an output port, a receiver, a transmitter, and storage devices (e.g., a persistent solid state drive, a hard disk drive, a compact disk drive, and the like)).

It will be appreciated that the functions depicted and described herein may be implemented in hardware or in a combination of software and hardware, e.g., using a general purpose computer, one or more application specific integrated circuits (ASIC), or any other hardware equivalents. In one embodiment, the cooperating process 705 can be loaded into memory 704 and executed by processor 703 to implement the functions as discussed herein. Thus, cooperating process 705 (including associated data structures) can be stored on a computer readable storage medium, e.g., RAM memory, magnetic or optical drive or diskette, and the like.

It will be appreciated that computing device 700 depicted in FIG. 7 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. A method performed by a network computing device configured for allocating a group of content channels among a plurality of slots of a radio frequency (RF) signal, comprising:

identifying for each content channel within said group of content channels a bandwidth requirement and a current RF slot assignment;

determining, for each RF slot, a respective plurality of allowable content channel assignment combinations;

determining, for said group of content channels, a minimum number of RF slots sufficient to distribute said group of content channels;

determining a minimum number of content channel reassignments sufficient to allocate said group of content channels to said minimum number of RF slots; and reassigning a corresponding minimum number of content channels to generate thereby a channel map including said plurality of content channel allocated to said minimum number of RF slots.

2. The method of claim 1, further comprising receiving one or more channel maps including bandwidth requirements and current RF slot assignments for each of said content channels in said group of content channels.

3. The method of claim 2, further comprising receiving additional channel map requirements configured to modify one or more of said determining allowable RF slot content channel assignment combinations, determining a minimum number of RF slots sufficient to distribute said group of content channels, and determining a minimum number of content channel reassignments sufficient to allocate said group of content channels to said minimum number of RF slots.

4. The method of claim 2, wherein said reassigning comprises:

instantiating an export table according to an input table format and including RF slot information and program type information for each of said content channel;

populating the export table with program channel information for those program channels that were not reassigned to different RF slots.

5. The method of claim 4, wherein said populating the export table with program channel information for those program channels that were not reassigned to different RF slots is performed by joining export and import tables based on matching EIA Channel/Program Type/Order within Program Type.

6. The method of claim 1, wherein determining, for said group of content channels, a minimum number of RF slots (xi) sufficient to distribute said group of content channels is performed in accordance with the following equation:

$$\text{Minimize } \sum_{i=1}^{N} x_i$$

$$\text{Subject to: } \sum_{i=1}^{N} a_{ik} x_i \geq D_k \ \forall \, k, k = 1, \ldots, K$$

$$x_i \geq 0, \text{ integer}$$

where:
$x_i$=number of slot assignment patterns of type i needed for the lineup
$a_{ik}$=number of type k channels included in slot pattern i,
$D_k$=total number of type k channels required by the lineup,
N=total number of unique patterns that are capable of fitting into an slot
K=total number of channel types.

7. The method of claim 1, wherein determining a minimum number of content channel reassignments sufficient to allocate said group of content channels to said minimum number of RF slots is performed in accordance with the following equation:

$$\text{Minimize} \sum_{i=1}^{M} \sum_{j=1}^{N} c_{ij} x_{ij}$$

$$\text{Subject to: } \sum_{i=1}^{M} \sum_{j=1}^{N} a_{jk} x_{ij} \geq D_k \;\; \forall k, k = 1, \ldots, K$$

$$\sum_{i=1}^{M} \sum_{j=1}^{N-1} x_{ij} = L$$

$$\sum_{j=1}^{N} x_{ij} = 1 \;\; \forall i, i = 1, \ldots, M$$

where:
- $x_{ij}$=0 or 1 (1 if pattern j is assigned to EIA i, 0 otherwise)
- $c_{ij}$=number of channel assignment changes/moves required if pattern j is assigned to slot i,
- $a_{jk}$=number of channels of type k in pattern j,
- $D_k$=number of channels of type k required by the lineup
- L=number of slots to be assigned channels
- N=number of patterns (Note: Pattern N contains 0 channels)
- M=number of slots
- K=total number of channel types.

8. The method of claim 1, wherein determining a minimum number of content channel reassignments sufficient to allocate said group of content channels to said minimum number of RF slots, and determining, for said group of content channels, a minimum number of RF slots (xi) sufficient to distribute said group of content channels is performed in accordance with the following equation:

$$\text{Minimize: } \sum_{i=1}^{M} \sum_{j=1}^{N} c_{ij} x_{ij} + \sum_{i=1}^{M} 1000 y_i$$

$$\text{Subject to: } \sum_{i=1}^{M} \sum_{j=1}^{N} a_{jk} x_{ij} \geq D_k \;\; \forall k, k = 1, \ldots, K$$

$$\sum_{j=1}^{N} x_{ij} - 1000 y_i \leq 0 \;\; \forall i, i = 1, \ldots, M$$

$$\sum_{j=1}^{N} x_{ij} \leq 1 \;\; \forall i, i = 1, \ldots, M$$

where:
- $y_i$=0 or 1 (1 if EIA i is used, 0 otherwise)
- $x_{ij}$=0 or 1 (1 if pattern j is assigned to EIA i, 0 otherwise)
- $c_{ij}$=number of channel assignment changes/moves required if pattern j is assigned to slot i,
- $a_{jk}$=number of channels of type k in pattern j,
- $D_k$=number of channels of type k required by the lineup
- N=number of patterns
- M=number of slots
- K=total number of channel types.

9. The method of claim 1, wherein said method is invoked for each RF signal providing content channels to respective customer premises equipment (CPE) via respective RF slots included therein.

10. The method of claim 9, further comprising:
receiving a control signal indicative of an optimization requirement associated with one or more CPE; and
identifying, for each CPE, a respective RF signal providing content channels thereto via a respective plurality of RF slots.

11. The method of claim 9, further comprising:
receiving a control signal indicative of an optimization requirement associated with one or more congested communications links; and
identifying, for each of said communications links, each RF signal providing content channels thereby to respective CPE via respective RF slots.

12. The method of claim 9, further comprising:
receiving a control signal indicative of an optimization requirement associated with one or more network paths;
identifying, for each of said network paths, each communications link forming said network path and providing content channels thereby to respective CPE via respective RF slots.

13. The method of claim 10, wherein said method is invoked in accordance with a rank order of said RF signals providing content channels to respective CPE via respective RF slots.

14. The method of claim 13, wherein said rank order is determined in accordance with a number of communications links associated with an RF signal.

15. The method of claim 13, wherein said rank order is determined in accordance with a congestion level of communications links associated with an RF signal.

16. A tangible and non-transient computer readable storage medium storing instructions which, when executed by a computer, adapt the operation of the computer to perform a method of allocating a group of content channels among a plurality of slots of a radio frequency (RF) signal, the method comprising:
identifying for each content channel within said group of content channels a bandwidth requirement and a current RF slot assignment;
determining, for each RF slot, a respective plurality of allowable content channel assignment combinations;
determining, for said group of content channels, a minimum number of RF slots sufficient to distribute said group of content channels;
determining a minimum number of content channel reassignments sufficient to allocate said group of content channels to said minimum number of RF slots; and
reassigning a corresponding minimum number of content channels to generate thereby a channel map including said plurality of content channel allocated to said minimum number of RF slots.

17. The computer readable storage medium of claim 16, wherein the method further comprises receiving one or more channel maps including bandwidth requirements and current RF slot assignments for each of said content channels in said group of content channels.

18. The computer readable storage medium of claim 17, wherein the method further comprises receiving additional channel map requirements configured to modify one or more of said determining allowable RF slot content channel assignment combinations, determining a minimum number of RF slots sufficient to distribute said group of content channels, and determining a minimum number of content channel reassignments sufficient to allocate said group of content channels to said minimum number of RF slots.

19. A computer program product comprising a non-transitory computer readable medium storing instructions for causing a processor to perform a method of allocating a group of content channels among a plurality of slots of a radio frequency (RF) signal, the method comprising:
- identifying for each content channel within said group of content channels a bandwidth requirement and a current RF slot assignment;
- determining, for each RF slot, a respective plurality of allowable content channel assignment combinations;
- determining, for said group of content channels, a minimum number of RF slots sufficient to distribute said group of content channels;
- determining a minimum number of content channel reassignments sufficient to allocate said group of content channels to said minimum number of RF slots; and
- reassigning a corresponding minimum number of content channels to generate thereby a channel map including said plurality of content channel allocated to said minimum number of RF slots.

20. An apparatus for allocating a group of content channels among a plurality of slots of a radio frequency (RF) signal, the apparatus comprising:
- a spectral manager including a processor configured for:
- identifying for each content channel within said group of content channels a bandwidth requirement and a current RF slot assignment;
- determining, for each RF slot, a respective plurality of allowable content channel assignment combinations;
- determining, for said group of content channels, a minimum number of RF slots sufficient to distribute said group of content channels;
- determining a minimum number of content channel reassignments sufficient to allocate said group of content channels to said minimum number of RF slots; and
- reassigning a corresponding minimum number of content channels to generate thereby a channel map including said plurality of content channel allocated to said minimum number of RF slots.

21. The apparatus of claim 20, wherein said spectral manager processor is configured to allocate channel data for each of a plurality of RF channels supporting respective customer premises equipment (CPE) within at least one group of CPE.

22. The apparatus of claim 21, wherein said group of CPE is defined according to one or more of CPE within a neighborhood, CPE within a region, CPE having common capability, CPE having a common content channel package and CPE having a common Quality of Service (QoS) guarantee.

23. The apparatus of claim 20, wherein said spectral manager processor is configured to transmit said channel map toward a head end communicatively coupled to said CPE, said head end configured to provide content channels to said CPE in accordance with said channel map.

24. The apparatus of claim 21, wherein said spectral manager processor is further configured for:
- receiving, from a controller associated with a head end communicatively coupled to said CPE, a current channel map defining current slot assignments of each content channel within said group of content channels; and
- transmitting, toward said controller associated with said head end communicatively coupled to said CPE, a revised channel map defining slot assignments of each content channel within said group of content channels in accordance with said reassigning.

\* \* \* \* \*